July 2, 1929.  A. STOLL  1,719,572
VALVE CONSTRUCTION FOR COMPRESSORS AND REFRIGERATING PUMPS
Filed Jan. 23, 1928
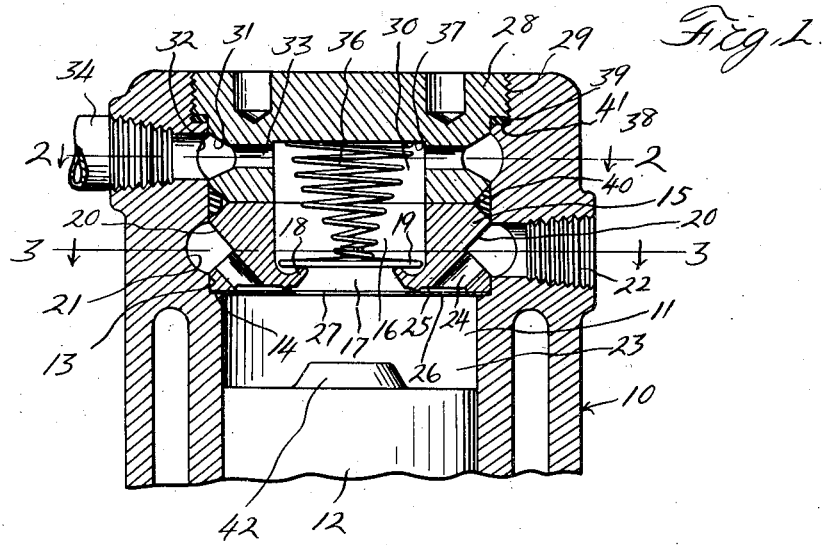
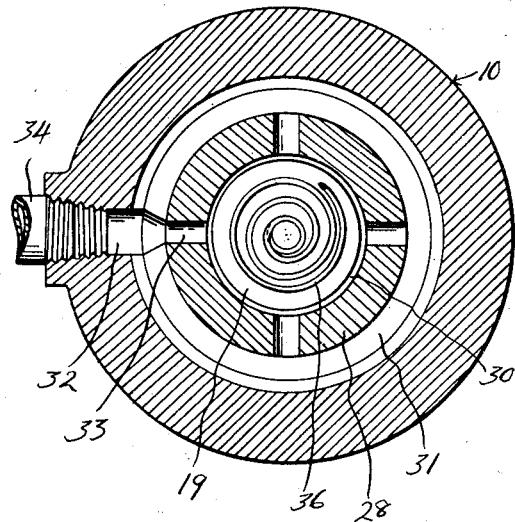
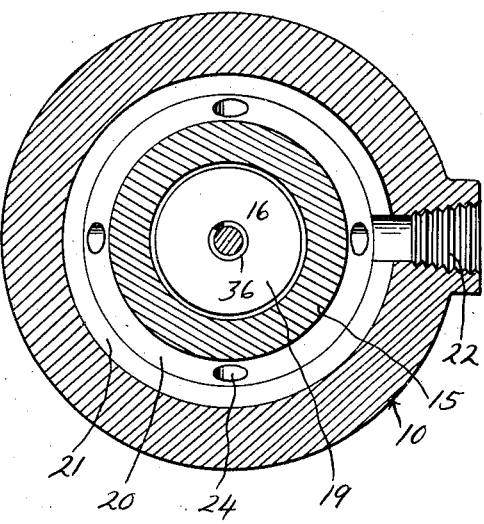
Inventor
Albert Stoll
By Whittemore Hulbert Whittemore Belknap
Attorneys Patented July 2, 1929.

1,719,572

UNITED STATES PATENT OFFICE.

ALBERT STOLL, OF DETROIT, MICHIGAN.

VALVE CONSTRUCTION FOR COMPRESSORS AND REFRIGERATING PUMPS.

Application filed January 23, 1928. Serial No. 248,861.

This invention relates to valve assemblies for compressors particularly designed for use in connection with refrigerating apparatus, and the invention has as one of its primary objects to provide a valve assembly of the above character distinguished by its simplicity of construction and operation which not only enhances its value both mechanically and commercially but provides a design of a strong and durable nature.

The invention further consists in the peculiar construction as hereinafter set forth.

In the drawings:

Figure 1 is a central section through the compressor in the axial plane of the cylinder and piston;

Figure 2 is a section on the line 2—2 of Figure 1; and

Figure 3 is a section on the line 3—3 of Figure 1.

Referring now more specifically to the drawing, it is to be noted that there is illustrated a compressor 10 having a cylinder 11 for the reciprocating piston 12. The cylinder 11 is preferably counterbored as at 13 forming the annular shoulder 14 upon which the valve seat member 15 is adapted to seat. As shown, this member is sleeved within the enlarged portion 13 of the cylinder and is provided with a central opening 16 having a reduced portion 17 terminating in an upwardly extending annular flange 18 constituting a seat for the exhaust valve 19. The valve seat member 15 is further provided with an annular groove 20 in the periphery thereof arranged to communicate with the peripheral groove 21 formed in the cylinder walls. Arranged within the cylinder wall opposite the groove 21 and communicating therewith is an inlet passage 22 through which the refrigerant is permitted to enter the compressor. For establishing communication between the groove 20 and the chamber 23, defined by the head of the piston and lower wall of the member 15, I provide a series of circumferentially spaced passages 24 extending from the groove 20 and opening into the annular recess 25 formed in the bottom wall of the member 15 adjacent the reduced portion 17 of the opening 16. For controlling the passage of refrigerant through the passages 24 the valve member 26 is provided which as shown is in the form of an annulus having a central opening 27 registering with the reduced opening 17. The body portion of the valve member 26 extends across the recess 25 and is anchored at the periphery thereof between the shoulder 14 and member 15, the inner edge of the valve 26 merely engaging the bottom surface of the member 15 adjacent to the reduced opening 17 thereof so as to be capable of flexing downwardly to permit the refrigerant to enter the chamber 23 from the intake opening 22. The valve member 26 is formed of a resilient material preferably spring metal, and is slightly dished so as to be self closing at the end of the suction stroke.

For holding the member 15 in position within the counterbored portion 13 of the cylinder, and for closing the upper end of the cylinder, I provide a second member 28 threadedly engaging an enlarged portion 29 of the cylinder and provided with a portion of reduced diameter arranged to engage the member 15 and hold the same against the shoulder 14. As shown, the member 28 is further provided with a central recess 30 of substantially the same diameter as the opening 16 and cooperates therewith to form an outlet valve chamber.

The member 28 like the member 15 is also provided with a circumferentially extending groove 31 arranged to communicate with an annular groove 32 formed in the cylinder wall. Extending radially inwardly from the groove 31 and communicating with the outlet valve chamber is a series of passages 33. Thus, from the foregoing it will be apparent that communication between the outlet valve chamber and the conduit 34 is established by means of the passages 33 and annular groove 31 registering with the groove 32 formed in the cylinder wall.

To insure proper seating of the outlet valve member 19, a suitable coil spring 36 is provided. As shown one end of this spring abuts the wall 37 of the recess 30 and the opposite end thereof engages the valve member. To prevent the refrigerant from leaking past the member 28 to the exterior of the compressor, the seals 38 and 39 are provided. The seal 38 is disposed in an annular groove 40 formed by chamfering off the periphery of the upper and lower faces of the members 15 and 28 respectively while the seal 39 is disposed between the shoulder 41 formed by the enlarged portion 29 and the lower wall of the member 28. With such an arrangement an effective seal is provided between the inlet and outlet ports.

In order to reduce the clearance in the compression chamber 23 to the minimum, the piston head is provided with a raised portion 42 adapted in the upper position of the piston to project through the aperture 27 in the valve 26 and reduced portion 17 of the opening 16.

With the construction as described, the gas to be compressed is introduced into the grooves 20 and 21 and passages 24 through the inlet opening 22 and during each downward stroke of the piston the suction will cause the inner edge of the valve 26 to deflect downwardly permitting the gas to enter the compression chamber 23. Upon the upward stroke of the piston the valve 26 will instantaneously close and the gas contained in the chamber will be compressed against the valve 19 which is held to its seat by the spring 36. Therefore when the pressure of the gas against the valve 19 excels the pressure exerted upon the valve 19 by the spring, the valve 19 will lift from its seat and the compressed volume within the cylinder will be quickly transferred to the outlet valve chamber and through the passages 33 to the system above.

What I claim as my invention is:

1. In a compressor, the combination with a cylinder, of a member sleeved within said cylinder having an opening therein and having an annular flange extending inwardly from said opening, and a valve member disposed within said opening and seated upon said flange.

2. In a compressor, the combination with a cylinder, of a valve assembly for the compressor including a member sleeved within said cylinder having vertically spaced valve seats thereon, valve members engageable with said seats for controlling the flow of fluid therethrough, and a second member threadedly engaging said cylinder having a portion engageable with the member aforesaid for holding the latter in position.

3. In a compressor the combination with a cylinder having a passage therethrough for the flow of a fluid, of a member sleeved within said cylinder having an opening therethrough for the passage of fluid, and means for controlling the flow of fluid through said opening including a second member secured within said cylinder having a recess therein registering with the opening aforesaid forming a chamber, said second member further having a passage therein establishing communication between the chamber and the passage formed in the cylinder.

4. In a compressor the combination with a cylinder having passages therethrough for the flow of a fluid and having spaced annular grooves formed in the side walls thereof, of a member sleeved within said cylinder having an annular groove therein registering with one of the grooves aforesaid and forming therewith an annular chamber, said member also having a series of openings therein establishing communication between said chamber and interior of the cylinder, a second member secured within said cylinder having an annular groove therein registering with the other of said first mentioned grooves and forming therewith a second chamber, said second member further having a series of openings therein establishing communication between the interior of the cylinder and said second chamber, and means for controlling the flow of fluid through the openings in both of said members.

5. In a compressor, the combination with a cylinder having inlet and outlet openings therein for the flow of refrigerant and having spaced grooves formed in the side walls thereof communicating with the inlet and outlet openings, and members disposed within said cylinder and cooperating with the said grooves to form spaced chambers, said members having passages therein establishing communication between the said chambers and interior of the cylinder, and means for controlling the flow of refrigerant through said passages.

6. In a compressor, the combination with a cylinder having inlet and outlet openings therein for the passage of a fluid, of means for controlling the flow of fluid through the inlet and outlet openings aforesaid including members disposed within said cylinder having annular grooves in the periphery thereof cooperating with the side walls of the cylinder to form vertically spaced annular chambers, said chambers arranged to communicate with the inlet and outlet openings aforesaid.

7. In a compressor, the combination with a cylinder having inlet and outlet openings therein, of means for controlling the flow of fluid through the inlet and outlet openings aforesaid including members disposed within said cylinder having annular grooves in the periphery thereof registering with the inlet and outlet openings aforesaid and cooperating with the side walls of the cylinder to form spaced chambers, and a member clamped between the members aforesaid and engageable with the side walls of the cylinder between the said chambers for effecting a tight seal therebetween.

8. In a compressor, the combination with a cylinder having an outlet passage therein for the flow of a fluid, of means for controlling the flow of fluid through said outlet passage including members secured within said cylinder having registering recesses communicating with the interior of said cylinder and constituting an outlet chamber for the fluid, and a valve disposed within said chamber for controlling the entrance of fluid to the latter, said chamber having means establishing communication between the cylinder and outlet opening aforesaid.

9. In a compressor, the combination with a cylinder having an outlet opening in one wall thereof for the passage of the fluid, of means for controlling the flow of fluid through said opening including a member secured within said cylinder and having a recess therein communicating with the said opening and with the interior of the cylinder, and a valve member arranged within the recess aforesaid for controlling the flow of fluid through said opening.

10. In a compressor, the combination with a cylinder having inlet and outlet openings therein for the passage of a fluid, a member arranged within said cylinder and having means including a groove in the periphery thereof establishing communication between one of said openings and the interior of the cylinder, said member further having a recess therein establishing communication between the interior of the cylinder and the other of said openings, and means associated with said member for controlling the flow of fluid through the recess and groove aforesaid.

11. In a compressor, the combination of a cylinder having an annular groove formed in the side walls thereof and having a passage for the flow of a fluid communicating with the groove, a member positioned within the cylinder opposite the groove having a central recess therein communicating with the cylinder and having a series of passages establishing communication between the groove and recess, and valve means for controlling the flow of fluid through the said recess.

12. In a compressor, the combination with a cylinder having inlet and outlet openings therein for the flow of a fluid and having spaced grooves formed in the side walls thereof communicating with the inlet and outlet openings, and means disposed within the said cylinder and cooperating with the grooves to form spaced chambers, said means establishing communication between the chambers aforesaid and interior of the cylinder, and valve means for controlling the flow of fluid through the said passages.

13. In a compressor, the combination with a cylinder having inlet and outlet passages therein for the flow of a fluid, of a member positioned within the cylinder having an opening therethrough establishing communication between the inlet and outlet passages aforesaid, an annular flange formed on said member and extending into the opening therein, and a valve member arranged within the said opening and adapted to seat upon the flange for controlling the flow of fluid through the opening.

14. In a compressor, the combination with a cylinder having inlet and outlet passages therein for the flow of a fluid, of means disposed within the cylinder cooperating with the side walls thereof to form spaced chambers communicating with the passages aforesaid and with the interior of the cylinder, and valve means for controlling communication between the cylinder and chambers aforesaid.

In testimony whereof I affix my signature.
ALBERT STOLL.